US012616858B2

(12) United States Patent
Lin

(10) Patent No.: US 12,616,858 B2
(45) Date of Patent: May 5, 2026

(54) NASAL MASK

(71) Applicant: Carol Chia Yuan Lin, Klamath Falls, OR (US)

(72) Inventor: Carol Chia Yuan Lin, Klamath Falls, OR (US)

( * ) Notice: Subject to any disclaimer, the term of this patent is extended or adjusted under 35 U.S.C. 154(b) by 978 days.

(21) Appl. No.: 17/697,618

(22) Filed: Mar. 17, 2022

(65) Prior Publication Data

US 2022/0305306 A1 Sep. 29, 2022

Related U.S. Application Data

(60) Provisional application No. 63/166,742, filed on Mar. 26, 2021.

(51) Int. Cl.
*A62B 23/06* (2006.01)
*A41D 13/11* (2006.01)
*A62B 9/06* (2006.01)

(52) U.S. Cl.
CPC .............. *A62B 23/06* (2013.01); *A41D 13/11* (2013.01)

(58) Field of Classification Search
CPC ....... A62B 23/06; A62B 9/06; A41D 13/1169; A41D 13/1176; A61M 16/06; A61F 5/08; A61K 36/53–539
See application file for complete search history.

(56) References Cited

U.S. PATENT DOCUMENTS 4,004,584 A 1/1977 Geaney
5,392,773 A 2/1995 Bertrand
2004/0089303 A1* 5/2004 Chien .................... A62B 23/06 128/205.27
2008/0223371 A1 9/2008 Guillory
2009/0194107 A1* 8/2009 Loeser .................. A61M 15/08 128/206.13
2016/0278967 A1 9/2016 Ierulli
2021/0329997 A1* 10/2021 Ahearn ................ A62B 18/084

FOREIGN PATENT DOCUMENTS

CA 2164256 C * 5/2003 ............. A41D 13/11
CN 1119549 A 4/1996
TW 593883 U * 4/2020
TW M593883 U 4/2020
(Continued)

OTHER PUBLICATIONS

Machine Translation of TW_593883_U (Year: 2020).*
(Continued)

*Primary Examiner* — Kendra D Carter
*Assistant Examiner* — Mautin I Ashimiu
(74) *Attorney, Agent, or Firm* — Daylight Law, P.C.

(57) ABSTRACT

Nasal masks and associated filters and structures are disclosed. One disclosed nasal mask includes a filter sheet comprising an inner side and an outer side, a pair of slits on the filter sheet, a first set of attachment means distributed on the inner side of the filter sheet, and a second set of attachment means distributed on the outer side of the filter sheet. The filter sheet is adapted to be bent along the pair of slits so that at least one attachment mean in the first set of attachment means is attached to at least one attachment means in the second set of attachment means.

17 Claims, 8 Drawing Sheets

(56) References Cited

FOREIGN PATENT DOCUMENTS

| | | | | |
|---|---|---|---|---|
| TW | M607819 U | 2/2021 | | |
| WO | WO-2019176998 A1 * | 9/2019 | ............. | A41D 13/11 |

OTHER PUBLICATIONS

Machine Translation of WO-2019176998-A1 (Year: 2019).*

Notice of the First Office Action from Chinese Patent Application No. 202110786264.4 dated Dec. 5, 2022, 9 pages.

International Preliminary Report on Patentability from International Application No. PCT/IB2022/052508 dated Oct. 5, 2023, 7 pages.

International Search Report and Written Opinion dated Jun. 27, 2022 from International Application No. PCT/IB2022/052508, 8 pages.

* cited by examiner

NASAL MASK

CROSS REFERENCE TO RELATED APPLICATIONS

This application claims the benefit of U.S. Provisional Patent Application No. 63/166,742 filed Mar. 26, 2021 and claims priority to Chinese Patent Application No. 2021107862644.4 filed Jul. 12, 2021, both of which are incorporated by reference herein in their entirety for all purposes.

BACKGROUND

Masks are generally used to filter harmful substances. For example, to block pollutants, allergens, and even pathogens commonly present in the inhaled air. Generally, masks cover the user's mouth and nose at the same time, which represents a considerably extensive area of the face. As a result, the cost of materials and manufacturing can be significant. Furthermore, the masks easily touch the eyes of the wearer, which can be not only uncomfortable but also antihygienic. In addition to affecting the physical appearance of the wearers, these kinds of masks are not convenient for daily activities such as conversation, exercise, sleep, etc. Common activities such as dental care or eating may even require the complete removal of the mask, or cause discomfort if conducted while wearing the mask. Additionally, the existing masks (e.g., N95 masks) are usually tied around the user's head or ears pressing the mask against the user's face, which usually leaves indentations on the face of the wearer. Moreover, the mask is also easily affected by the contour of the face, which can vary from user to user and makes it difficult to wear a same type of mask. As a result, it is not easy to achieve good air tightness and unfiltered air can still be able to enter through the unsealed parts of the mask.

In order to address the aforementioned problems, many nasal plugs containing filter materials have been developed to improve portability and aesthetics. However, although this kind of product can greatly reduce the volume of the overall filtering device, it is not easy to wear for a long time as it is highly invasive. Furthermore, their composition is complex and they can be easy to wear incorrectly due to their structure. These devices are generally configured to be fixed at the entrance of the user's nasal cavity in the form of a nasal obstruction, covering especially the front of the nose. In addition to easily affecting the smoothness of breathing, they can also be easy to fall off. In many cases, it can be even impossible to completely prevent the nasal cavity from contacting the air and harmful substances.

SUMMARY

This disclosure relates generally to nasal masks, and more specifically to foldable nasal masks.

Specific embodiments of the invention disclose a foldable nasal mask of small size, being easy to carry, providing low interference (e.g., with other masks and/or daily activities), and presenting high fixation (e.g., to the nose of a user). In specific embodiments if the invention, the design of the foldable nasal mask is both discreet and functional. In this way, it can greatly increase the public's willingness to use the foldable nasal mask, which can increase the continuous use time. In specific embodiments if the invention, the foldable nasal mask can be easily replaced to improve hygiene and practicality.

In specific embodiments of the invention, the reduced size of the foldable nasal mask allows the waste of filter materials to be reduced. The size and design also provide a mask that is easy to carry. The foldable nasal mask can be used by itself or in conjunction with other facial masks (e.g., face shields) if necessary.

BRIEF DESCRIPTION OF THE DRAWINGS

In the Figures, like reference numbers correspond to like components unless otherwise stated.

DETAILED DESCRIPTION

Figure 1A:
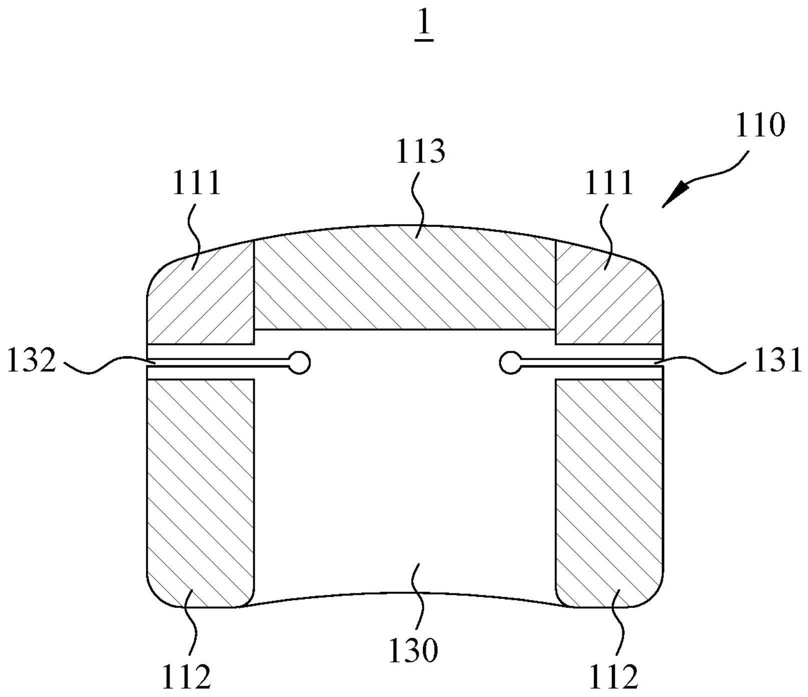
FIG. 1A illustrates an inner side view of a folding nasal mask, in accordance with specific embodiments of the invention disclosed herein.

Reference will now be made in detail to implementations and embodiments of various aspects and variations of the foldable masks described herein. Although several exemplary variations are described herein, other variations may include aspects of the foldable masks described herein combined in any suitable manner having combinations of all or some of the aspects described.

The foldable masks disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

The folded nasal mask of specific embodiments of the invention is small, beautiful, and inconspicuous. In some embodiments, the mask does not even need to be taken off during normal life activities such as eating, singing, speaking, sleeping, and looking at the teeth. The foldable nasal mask can filter air inhaled in the nasal cavity at any time and maintain the nasal cavity unobstructed at the same time. In specific embodiment of the invention, the nasal mask maintains moisture to improve the overall effect of protecting the respiratory tract.

In specific embodiments of the invention, the nasal mask is designed so that it does not interfere with facial recognition. Therefore, using facial recognition to pay or unlock the phone, or even through customs, can be possible without taking the mask off, which prolongs the overall use time and reduces the hassle of wearing it and the risk of being contaminated. In addition, the foldable nasal mask of specific embodiments of the present invention can reduce the use and waste of materials due to the small required volume, and also can reduce the transportation costs.

Replacement can be performed to improve hygiene. In specific embodiments, the nasal mask comprises adhesive components which are detachably attached and fixed to each other, so that the folding nasal mask of the present invention can be tightly fixed on the front end of the user's nose with less interference. It is not easy to move, and can be disassembled and reused depending on the situation.

In specific embodiments of the invention, the folding nasal mask of this invention can also be used with a nasal septum holder to strengthen the fixation of the folding nasal mask. Therefore, the nasal mask has the characteristics of being convenient to wear, easy to carry, and has good fixation, which can greatly increase the willingness to use, and be especially suitable for people who are not used to wearing masks. Furthermore, as previously stated, the folding nasal mask can be used alone or with other face shields or masks.

Specific embodiments of the invention disclose a foldable nasal mask which comprises a main body in the form of a filter sheet. The filter sheet can be of any suitable material used for filtering inhaled air, as will be described below in more detail. The filter sheet can be of any suitable shape adapted to cover a target area (e.g., the nostrils and/or the tip of the nose) when assembled, such as rectangular, squared, circular, elliptical, triangular, or any other regular or irregular shape. As used herein, the term "tip of the nose" is meant to encompass the extent of the tip of the nose, ala (or wings of the nose), front of the septum, and openings of the nostrils of a human and/or animal nose. In specific embodiments of the invention, the foldable nasal mask completely covers the front end of the user's nose and covers the sides of the user's two nostrils.

In specific embodiments of the invention, the filter sheet comprises one or more slits. The foldable nasal mask can be adapted to be "folded" and/or bent along such slit(s). The slits can be used for multiple purposes. In specific embodiments of the invention, the foldable nasal mask can be folded/bent along the slits to be assembled (for example, to convert the filter sheet into a tridimensional structure adapted to cover the tip of the nose). In specific embodiments of the invention, the foldable nasal mask can be folded/bent along the slits to be adjusted (for example, to adjust the mask to different sizes/shapes of nose). In specific embodiments of the invention, the filter sheet can be folded/bent inwardly (i.e., towards the inner side) along the slit(s) to be put away in a compact configuration while, for example, keeping the inner side (to interface with the user's nose) protected. These and other uses can be given to the slits on the filter sheet.

The filter sheet can comprise an inner side and an outer side. As used herein, the inner side refers to the side that faces a user's face when the foldable mask is worn, and the outer side refers to the opposite side, that does not face the user's face when the foldable mask is worn. Each of the inner side and the outer side can include various portions or regions, such as a top portion, a bottom portion, a right portion, a left portion, and a central portion. In specific embodiments of the invention, some of those portions can be separated by the one or more slits described before in this disclosure. For example, the filter sheet can include a pair of slits (e.g., one on the right portion and one on the left portion) separating the top portion and the bottom portion. Each of those portions (or part of them) can be made of or include different materials and/or elements for different purposes. For example, and as will be described below in more detail, some of those portions can include attachment means and/or fixating structures that can be used to assemble the mask and/or to better fix the mask to the user's nose.

As used herein, the term "attachment means" includes means for attaching and/or adhering different portions of the foldable nasal mask to each other (for example to assemble the foldable nasal mask) and/or means for attaching and/or adhering the foldable nasal mask to a user's face/nose (for example to fixate the foldable nasal mask to the user's face/nose). In specific embodiments of the invention, the attachment means are adhesives. For example, the attachment means can include any adhesive substance (e.g., glue) and/or adhesive surface (e.g., adhesive tape). Attachment means in the form of adhesives can serve to fix one part of the mask to another corresponding part of the mask (e.g., to assemble the foldable nasal mask), either by providing both parts to be adhered with adhesives or by providing one of the parts with adhesive able to adhere to a not adhesive part. Attachment means in the form of adhesives can also serve to fix the foldable nasal mask to user's face/nose, by providing the portions to be adhered with adhesive able to adhere to the target surface (e.g., human skin, animal hair, etc.). In specific embodiment of the invention, the attachment means include two-part attachment systems (for example to attach one part of the mask comprising one part of the attachment system to another part of the mask comprising the corresponding other part of the attachment system), such as hook and loop materials and/or hook and loop fasteners, snaps, buttons, and the like. In specific embodiments of the invention, the attachment means include fixating and or accommodating structures such as strips/clips (e.g., a bridge strip/clip or adjustable edge to adjust the mask to the nose bridge or other area), straps (e.g., to further fix the mask to the face), etc. In specific embodiments of the invention, the attachment means include interfaces and/or accommodating spaces or structures configured to accommodate and/or interact with external structures, such as external attachment means (e.g., a nasal septum clip to be used in combination with the foldable nasal mask) and/or other masks or face gear.

Various examples of a foldable nasal mask in accordance with the general description above will be given in the following description with reference to the figures. However, the illustrated examples are not a limitation of the present invention as multiple combinations and/or variations of the illustrated features can be derived from the illustrated examples.

Figure 1B:
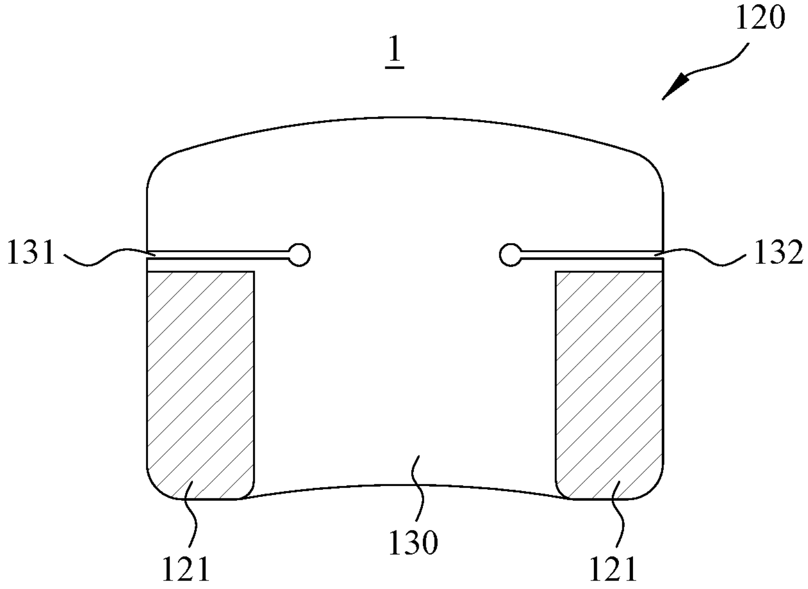
FIG. 1B illustrates an outer side view of a folding nasal mask, in accordance with specific embodiments of the invention disclosed herein.

FIG. 1A illustrates an inner side view of a foldable nasal mask 1 and FIG. 1B illustrates an outer side view of the foldable nasal mask 1, in accordance with specific embodiments of the present invention. As illustrated, the foldable nasal mask 1 includes a main body comprising an inner side surface 110, an outer side surface 120, and opposite side edges on the left and right. The main body can be or otherwise include a filter sheet, so that the foldable nasal mask includes a filter portion 130. The filter portion 130 can be shaped to completely cover the two nostrils of a user, so as to filter the air inhaled by the user.

The foldable nasal mask 1 has a generally rectangular shape with rounded corners. However, as described before in this disclosure, this is not a limitation of the invention. The edges of the foldable nasal mask can be irregular, for example to better fit the nose of a user. In the illustrated example, an upper edge is curved outwards, and a lower edge is curved inwards, while the side edges are straight lines. However, this is not a limitation of the present invention, and the edges can take any shape as long as they serve the intended purpose (e.g., cover the expected area of the nose).

In the example illustrated in FIGS. 1A and 1B, the foldable nasal mask 1 and more specifically the filter portion 130 includes a pair of slits (a right slit 131 and a left slit 132) from the two sides to the filter portion 130 respectively.

The foldable nasal mask 1 can also include attachment means. As illustrated in the example of FIGS. 1A and 1B, the foldable nasal mask can include a first set of attachment means (e.g., 111, 112, 113) distributed on the inner side surface 110 of the filter sheet and a second set of attachment means (e.g., 121) distributed on the outer side surface 120 of the filter sheet. In specific embodiments of the invention, the attachment means can be distributed among various regions or portions of the inner and outer side of the foldable nasal mask. For example, and as illustrated in the example of FIG. 1A, the foldable nasal mask 1 can include upper inner side portions on the left and right sides of the upper portion of the inner side surface 110. In the illustrated example, upper inner side attachment means 111 are provided thereon. The foldable nasal mask can also include lower inner side portions on the left and right sides of the lower part of the inner side surface 110. In the illustrated example, lower inner side attachment means 112 are provided thereon. As another example, and as illustrated in the example of FIG. 1B, the foldable nasal mask can also include lower outer side portions on the left and right sides of the lower part of the outer side surface 120. In the illustrated example, lower outer side attachment means 121 are provided thereon.

In specific embodiments of the present invention and as also illustrated in the example of FIGS. 1A and 1B, one or more of the attachment means in the sets of attachment means can be attachment means for attaching different portions of the foldable nasal mask to each other. For example, the filter sheet can be adapted to be bent along the pair of slits so that at least one attachment means (e.g., at least one attachment means 111 in the first set of attachment means on inner side surface 110) is attached to at least one other attachment means (e.g., at least one attachment means 121 in the second set of attachment means on the outer side surface 120). In this way, a tridimensional structure can be formed from the filter sheet by attaching the parts together.

Figure 2:
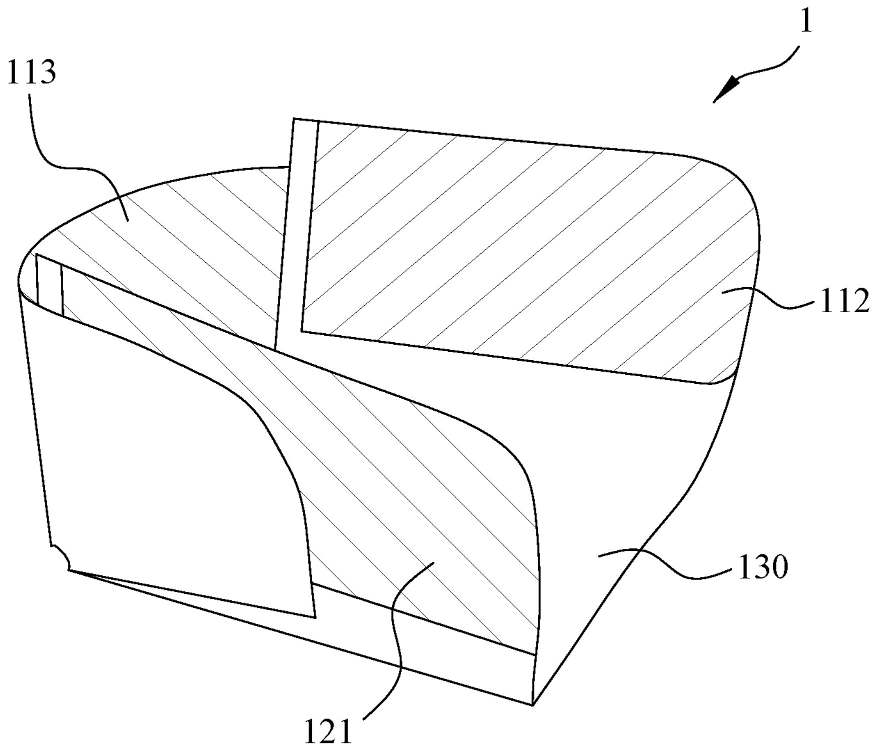
FIG. 2 illustrates a folded perspective view of a foldable nasal mask in accordance with specific embodiments of the invention disclosed herein.

FIG. 2 illustrates the folded nasal mask 1 folded inwardly along the right slit 131 and the left slit 132. As illustrated, the upper inner attachment means 111 and the lower outer attachment means 121 can be attached together, so that the folding nasal mask 1 of the present invention forms into a tridimensional structure, adapted to completely cover the front end of the user's nose.

In specific embodiments of the invention, both the upper inner attachment means 111 and the lower outer attachment means 121 can be adhesive elements. The adhesive elements may be any material and/or element conventionally used for adhering and fixing objects, such as adhesive substances or tapes. In specific embodiments of the invention, only one of the upper inner attachment means 111 and the lower outer attachment means 121 is an adhesive element while the other is not (e.g., the other can be a surface to which the adhesive element adheres, such as the surface of the filter sheet itself or other surface of which the respective portion of the foldable nasal mask is made). In specific embodiments of the invention, each of the upper inner attachment means 111 and the lower outer attachment means 121 is a part of a two parts attachment systems such as complementary parts of a hook and loop material, an adhering felt, a snap button, or other equivalent attachment means in the technical field of the present invention.

In specific embodiments of the present invention and as also illustrated in the example of FIGS. 1A, 1B, and 2, one or more of the attachment means in the sets of attachment means can be attachment means for adhering at least a portion of the foldable nasal mask to the user's nose/face. For example, the upper part of the inner side surface 110 of the foldable nasal mask 1 includes an upper inner side attachment means 113, which can be configured to be adhered to the front end of the user's nose, for example to fix the mask, and/or to avoid gaps and achieve a better blocking and filtering effect. The upper inner side attachment means 113 can be any attachment mean used by those with ordinary knowledge in the field of creative technology to fix an object to a surface such as the user's skin. The materials and/or elements on the skin surface can be, but are not limited to, artificial skin, breathable tape, seamless tape, self-adhesive bandage, etc., which can have an adhesive substance such as glue, and/or can be used for sticking. As another example, additional attachment means can be provided to adhere the foldable nasal mask to other portions of the nose/face, such as attachment means 112 which can be provided to adhere the inner side surface of the foldable nasal mask to the sides of the nose. In specific embodiments of the invention, the lower edge of the inner side surface 110 of the foldable nasal mask 1 of the present invention may further include a lower edge attachment means (not shown in the figure), so as to strengthen the fixing of the foldable nasal mask 1 to the user (e.g., to the nose tip of a person). These and other (e.g., in different areas, and of different shapes) attachment means can be distributed on the foldable nasal mask surfaces so as to fix the foldable nasal mask to the user's nose/face.

Figure 3:
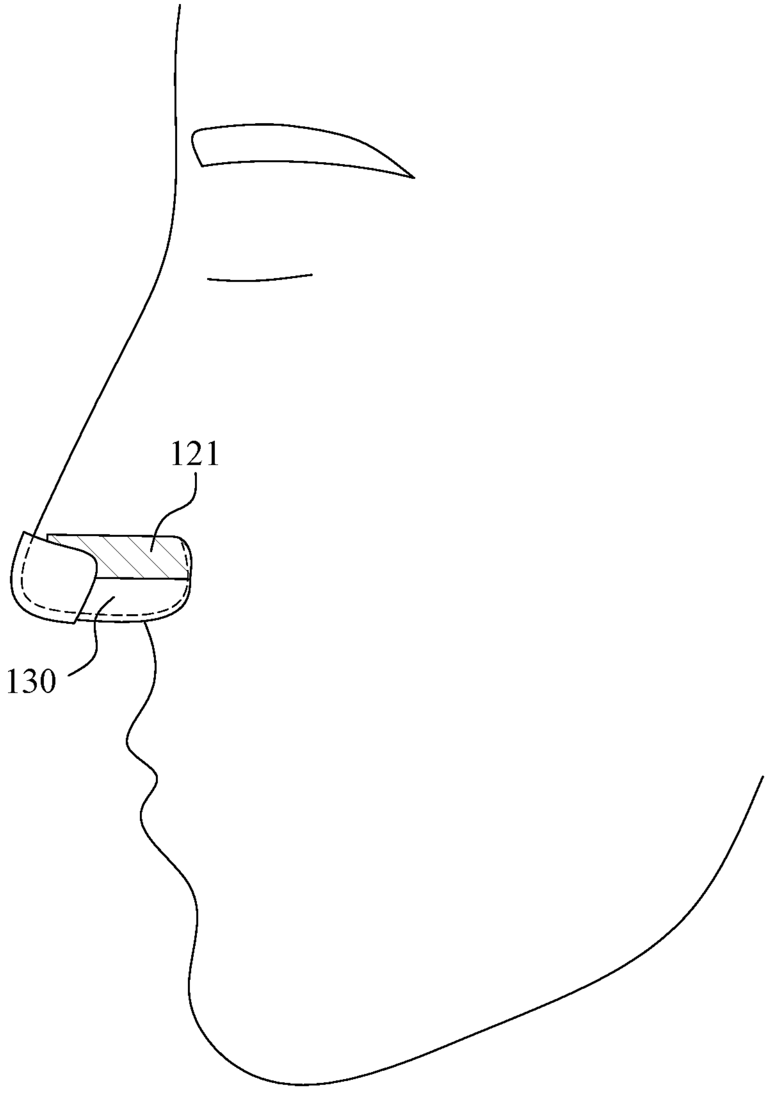
FIG. 3 illustrates a schematic diagram of the use of the foldable nasal mask of FIG. 2, in accordance with specific embodiments of the invention disclosed herein.

FIG. 3 illustrates a schematic diagram of the use of the folded nasal mask 1 of FIG. 2. As illustrated, when using the folded nasal mask 1 of the present invention, the filter portion 130 can be placed with the inner side surface 110 facing the user's nose, covering the user's two nostrils. The lower inner side attachment means 112 and/or the upper inner side attachment means 113 can be adhered to the user's nose, and then the folded nasal mask 1 can be folded along the right slit 131 and the left slit 132, so that the upper inner attachment means 111 and the lower outer attachment means 121 can be attached together. In this way, the folding nasal mask 1 of the present invention can cover the entire nose front end of the user.

In specific embodiments of the invention, the right slit 131 and the left slit 132 may include portions of a slightly different shape (e.g., a circular slit end as in the example of FIGS. 1A and 1B, a wider slit portion, a square slit, or any shape) that is slightly larger at one end of the slits close to the filter portion 130. This can serve to reduce any unevenness of the folded nasal mask 1 as a whole when the filter portion 130 overlaps when folded inwardly along the right slit 131 and the left slit 132.

In specific embodiments of the invention, all the attachment means in the sets of attachment means are adhesives. In other specific embodiments of the invention, some attachment means in the sets of attachment means are adhesives while others are not. For example, one of attachment means 111 and 121 can be an adhesive while the other is a surface of any material (e.g., the material of the filter sheet itself) to which the adhesive portion can be adhered. In other specific embodiments of the invention, some attachment means in the sets of attachment means are adhesives while others are other types of attachment means. The other types of attachment means can be two-part attachment means such as hook and loop fasteners. For example, and with reference back to the example of FIGS. 1A, 1B, 2 and 3, the first set of attachment means on inner side surface 110 can include at least an adhesive (e.g., attachment means 113 and 112 can be adhesives for adhering the mask to the user's face/nose) and at least a two-part attachment means (e.g., attachment means 111 can be the hook or the loop of a hook and loop fastener). On the other hand, the second set of attachment means on outer side surface 120 can include the matching part of the two-part attachment means (e.g. attachment means 121 can be the hook or the loop that matches attachment means 111).

Figure 4A:
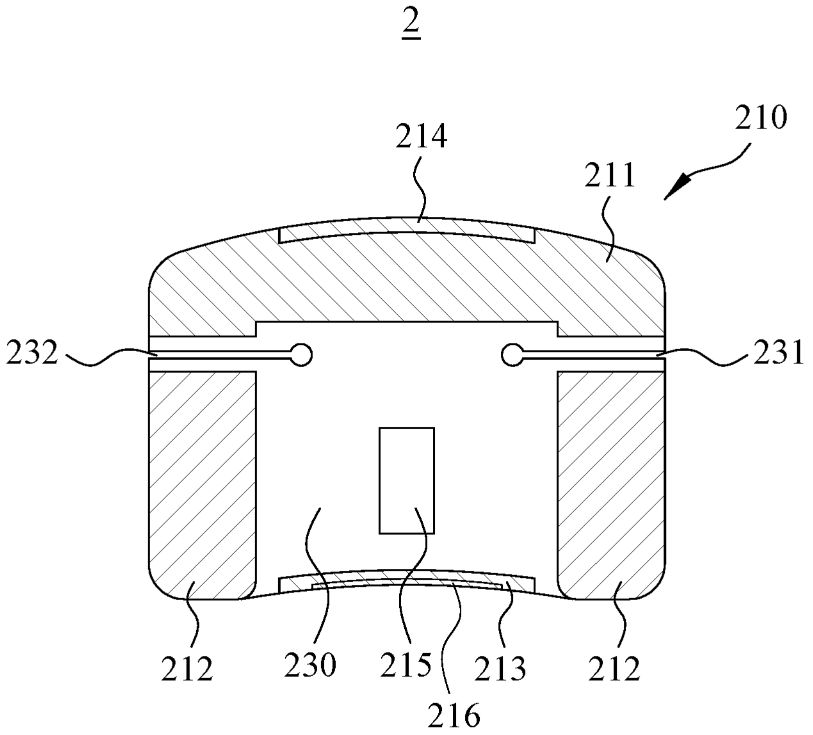
FIG. 4A illustrates an inner side view of a foldable nasal mask in accordance with specific embodiments of the invention disclosed herein.
Figure 4B:
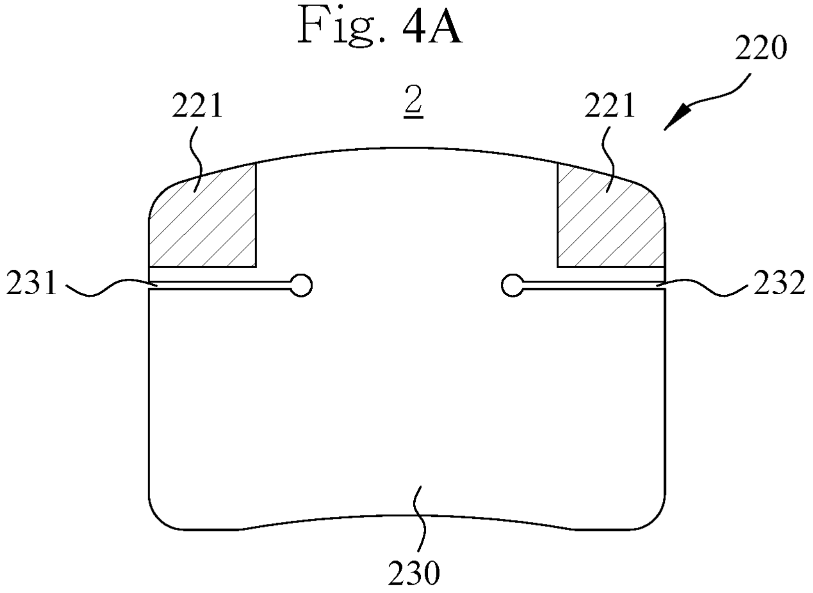
FIG. 4B illustrates an outer side view of a foldable nasal mask in accordance with specific embodiments of the invention disclosed herein.

FIG. 4A illustrates an inner side view of a foldable nasal mask 2 and FIG. 4B illustrates an outer side view of the foldable nasal mask 2, in accordance with specific embodiments of the invention. The folding nasal mask 2 of the present invention includes a main body having an inner side surface 210, an outer side surface 220, and opposite side edges, and forming a filter portion 230, similar to what has been described with reference to nasal mask 1. The filter portion 230 can be adapted to completely cover the two nostrils of a user, so as to filter the air inhaled by the user. The foldable nasal mask 2 includes a right slit 231 and a left slit 232 from the two sides to the filter portion 230 respectively, and the foldable nasal mask can be adapted to be bent along such slits. As previously mentioned, the slits can separate various portions of the foldable nasal mask such as an upper portion and a lower portion.

Foldable nasal mask 2 includes a set of attachment means distributed among the inner side surface 210 and the outer side surface 220. Foldable nasal mask 2 illustrates a distribution of attachment means which is different than the distribution of foldable nasal mask 1. This nonlimiting example of an alternative distribution of attachment means serves to illustrate how the present invention can be applicable regardless of the exact number and/or position of attachment means.

The inner side surface 210 includes a first set of attachment means (e.g., attachment means 211, 212, or 213, or strip 214) and the outer side surface 220 includes a second set of attachment means 221. As described with reference to foldable nasal mask 1, at least one of the attachment means can be used to attach portions of the foldable nasal mask to each other. For example and as illustrated in FIG. 4A, a lower inner side attachment means 212 can be provided on a lower inner side portion on the left and right sides of the lower part of the inner side surface 210. On the other hand and as illustrated in FIG. 4B, an upper outer side attachment means 221 can be provided on the left and right sides of the upper part of the outer side surface. The respective attachment means can be attached together so that the foldable nasal mask 2 is assembled in the tridimensional structure.

Figure 5:
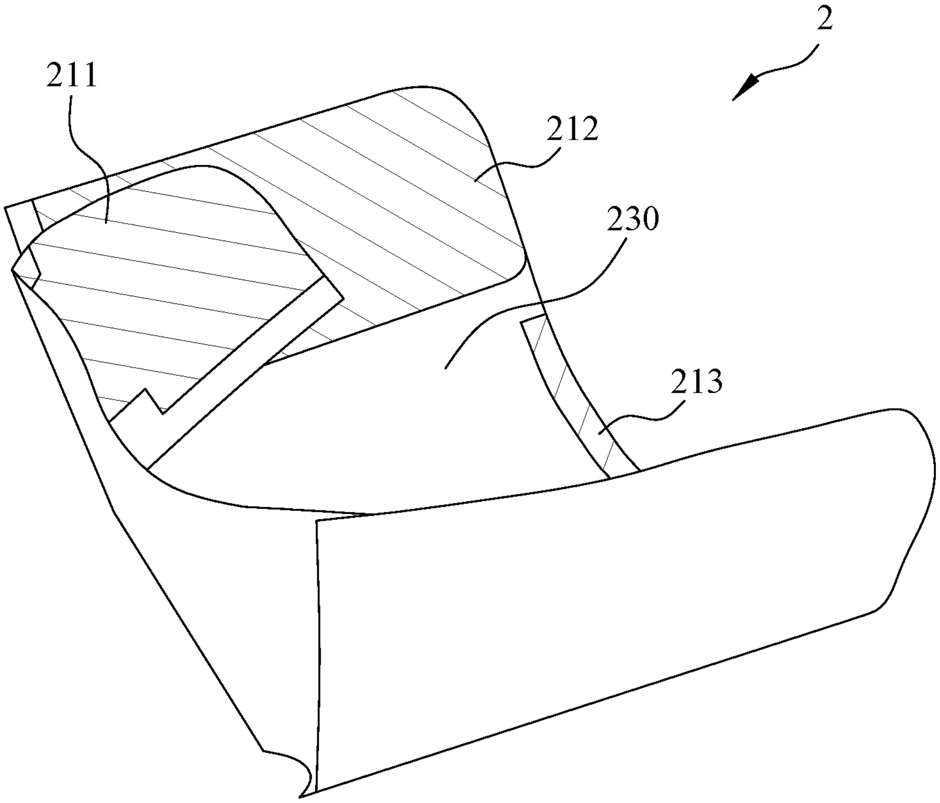
FIG. 5 illustrates a folded perspective view of a foldable nasal mask, in accordance with specific embodiments of the invention disclosed herein.

FIG. 5 illustrates the folded nasal mask 2 folded inwardly along the right slit 231 and the left slit 232. In this position, the upper outer attachment means 221 and the lower inner attachment means 212 can be connected together, and the folding nasal mask 2 of the present invention can be formed into a tridimensional structure, so as to completely cover the front end of the user's nose. As with the previous examples, the attachment means to be attached together can be both adhesives, or an adhesive and a surface to which the adhesive can be adhered, or matching parts of a two-part attachment means such as hook and loop fasteners.

As also described with reference to foldable nasal mask 1, at least one of the attachment means can be used to adhere the foldable nasal mask to the user's nose/face. For example, an upper inner side attachment means 211 can be provided on the upper portion of the inner side surface 210. In specific embodiments of the invention, the upper inner side attachment means 211 can be located on the entire edge of the upper portion of the inner side surface 210. Alternatively, or in combination, the upper inner side attachment means 211 (e.g., an adhesive component) may be located at the left and right sides of the upper part of the inner side surface 210. The upper edge of the inner side surface 210 of the folding nasal mask 2 of the present invention may further include an adhesive component (not shown in the figure), so that the folding nasal mask 2 of the present invention can be better adapted to the bridge of the user's nose, for example to avoid gaps and achieve a better blocking and filtering effect. In specific embodiments of the invention and as illustrated in FIG. 4A, the lower edge of the inner side surface 210 of the folded nasal mask 2 may further include a lower edge attachment means 213, which can be used to strengthen the fixing of the foldable nasal mask 2 to the user nose tip. All those attachment means can be used alone or in various combinations, and be of different shapes and in different positions depending on the desired attachment effect to be achieved.

Those attachment means can be adhesives configured to adhere to a user's face/nose and include any adhesive component known by those with ordinary knowledge in the art to fix an object on the skin. The materials and/or components of the surface can be, but are not limited to, artificial leather, breathable tape, seamless tape, self-adhesive bandage, etc., which have adhesive substance such as glue, and/or can be used for sticking.

Figure 6:
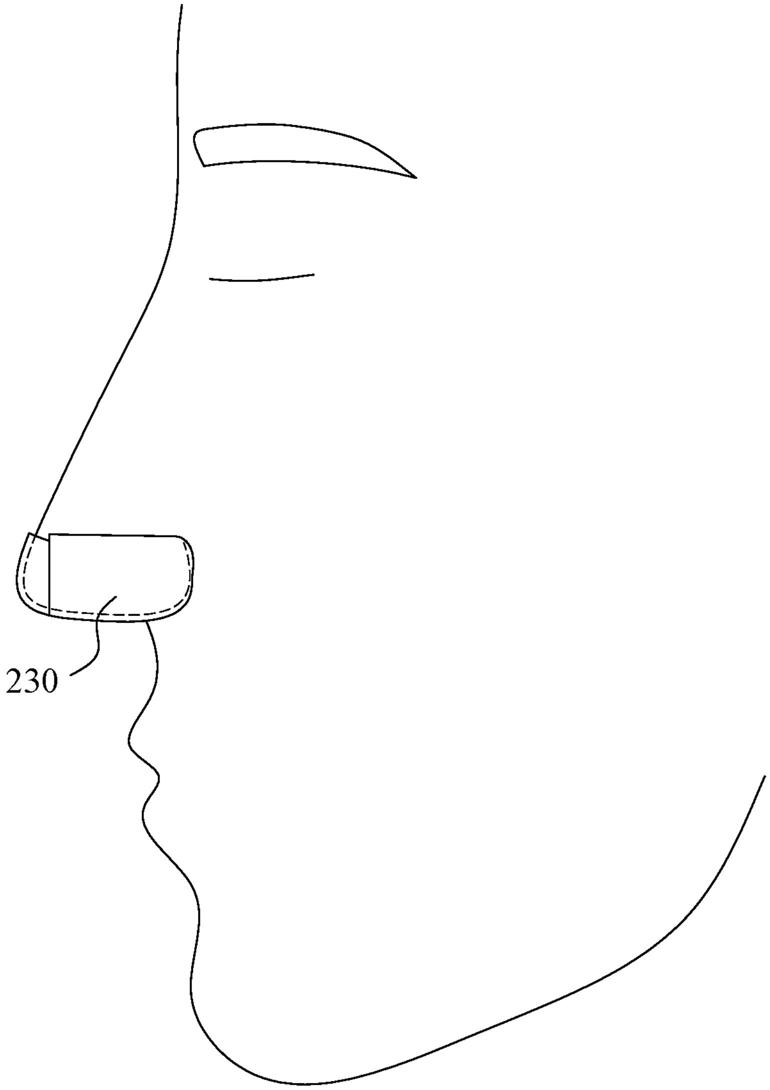
FIG. 6 illustrates a schematic diagram of the use of the foldable nasal mask of FIG. 5, in accordance with specific embodiments of the invention disclosed herein.

FIG. 6 illustrates a schematic diagram of the use of the folded nasal mask 2 of FIG. 5. As illustrated, when using the folded nasal mask 2 of the present invention, the filter portion 230 faces the direction of the user's nose with the inner side surface 210, and covers the user's two nostrils. The upper inner side attachment means 211 can be used to adhere to the user's nose bridge, and then the folding nasal mask 2 can be recessed along the right slit 231 and the left slit 232. The mask can then be folded, so that the upper outer attachment means 221 and the lower inner attachment means 212 are attached together. In this way, the folding nasal mask 2 of the present invention can cover the entire nose front end of the user.

In specific embodiments of the invention and as illustrated in FIG. 4A, the upper portion of the foldable nasal mask 2 may further include a strip 214 (e.g., a nose clip or bridge strip), which corresponds to the position of the bridge of the user's nose, and has the characteristics of being bendable, so it can be bent and shaped into a curved shape corresponding to the bridge of the user's nose. In this way, the folding nasal mask of specific embodiments of the invention can better fit the bridge of the user's nose, so as to reduce the discomfort of compression and avoid the generation of gaps to achieve a better blocking and filtering. The strip 214 can be, but is not limited to, a strip made of metal, plastic, or a combination of materials such as metal and plastic or any other suitable material. Although the strip 214 was illustrated with reference to foldable nasal mask 2, it can also be applied to foldable nasal mask 1 and any other foldable nasal mask described herein. Other strips (similar to strip 214) can be optionally added in other different places on any of the masks described herein. For example, a bottom strip 216 could also or alternatively be provided on a bottom edge of the mask to adjust the mask to the user's nose shape. The strips (such as strip 214 and strip 216) can be embedded with the mask, for example adhered thereto (covered or not by another layer of material) or provided in an interior of the filter sheet, between the inner and outer surfaces.

In specific embodiments of the invention and as also illustrated in FIG. 4A, the filter portion 230 may further include an accommodating space 215 for accommodating an external element, such as a fixing device. The accommodating space 215 may be, but is not limited to, a bag-like or pocket structure (open on one end), a tubular structure (open on both ends), or any other suitable structure. The external device can be, but is not limited to, a fixing pin of a nasal septum holding body, so that the folding nasal mask of the present invention can be more firmly installed at the front end of the user's nose (e.g., by attaching a nasal septum clip to the nose, and attaching the mask to the clip via the respective accommodating space 215 and a pin of the clip). Although the accommodating space 215 was illustrated with reference to foldable nasal mask 2, it can also be applied to foldable nasal mask 1 and any other foldable nasal mask described herein.

Figure 7A:
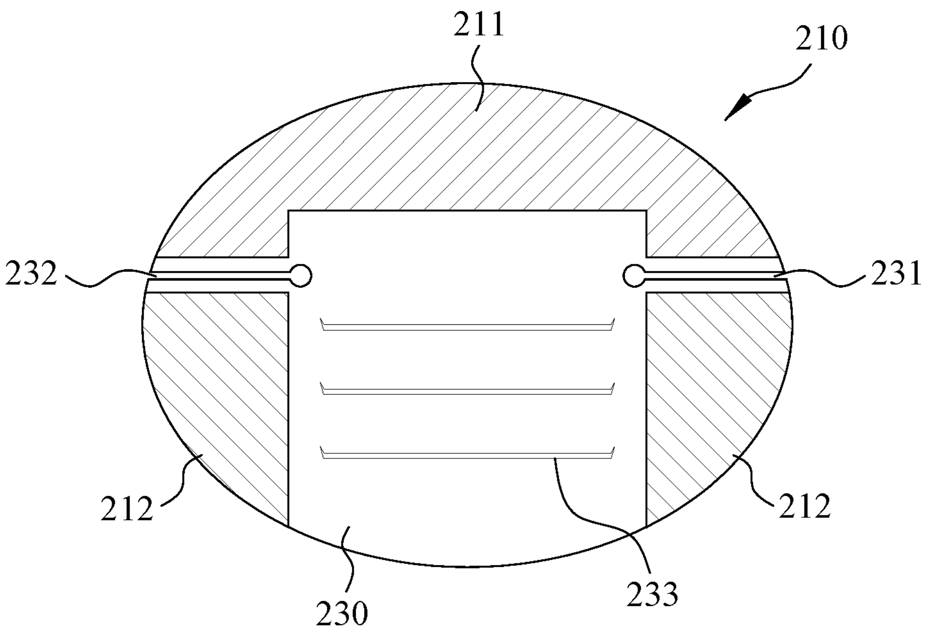
FIG. 7A illustrates an inner side view of a foldable nasal mask, in accordance with specific embodiments of the invention disclosed herein.
Figure 7B:
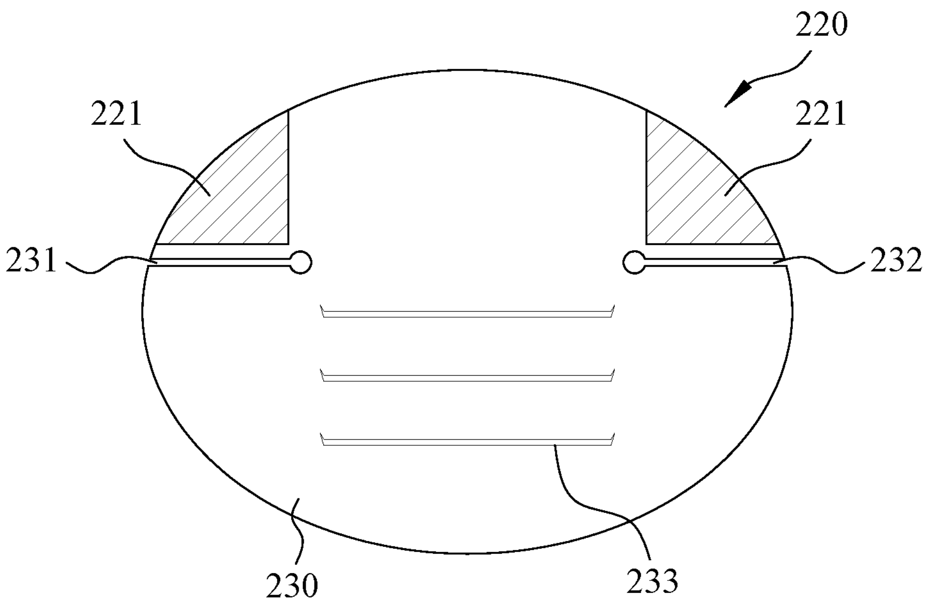
FIG. 7B illustrates an outer side view of a foldable nasal mask, in accordance with specific embodiments of the invention disclosed herein.

FIG. 7A illustrates the inner side view and FIG. 7B illustrates the outer side view of a foldable nasal mask, such as folding nasal mask, with different characteristics and features, in accordance with specific embodiments of the invention. As illustrated, the folding nasal masks (e.g., 1 and 2) of the present invention can be made into any shape as a whole, such as a rectangle, a circle, or an ellipse.

In specific embodiments of the invention and as illustrated in FIG. 7A, the filter portion 230 may further include one or more pleats, such as one or more transverse pleats 233 or one or more vertical pleats. The pleats, such as transverse pleat 233 or any vertical pleat can be configured to be opened, so that the area of the filter portion 230 can be increased. In this way, the space for breathing can increase, and the comfort of wearing the foldable nasal mask of the present invention can be improved. Additionally, the foldable nasal mask can be used for different users elastically, so as to be better adapted to different users' noses.

According to specific embodiments of the present invention, the filter portion (e.g., 130 and/or 230) may be composed of, but not limited to, a single-layered fabric or a multi-layered fabric, wherein the fabric can be any fabric commonly used for filtering by those with ordinary knowledge in the technical field of the invention. Materials that filter from particles such as viruses, dust, oil stains, suspended particles, droplets, etc., such as the material in N100, N99, N95, R100, R99, R95, P100, P99, and P95 as defined in the standard specification for the classification of mask filter materials announced in the United States. In specific embodiments of the invention, the filter portion 130 and/or 230 can contain at least one layer of melt-blown non-woven fabric.

Figure 8:
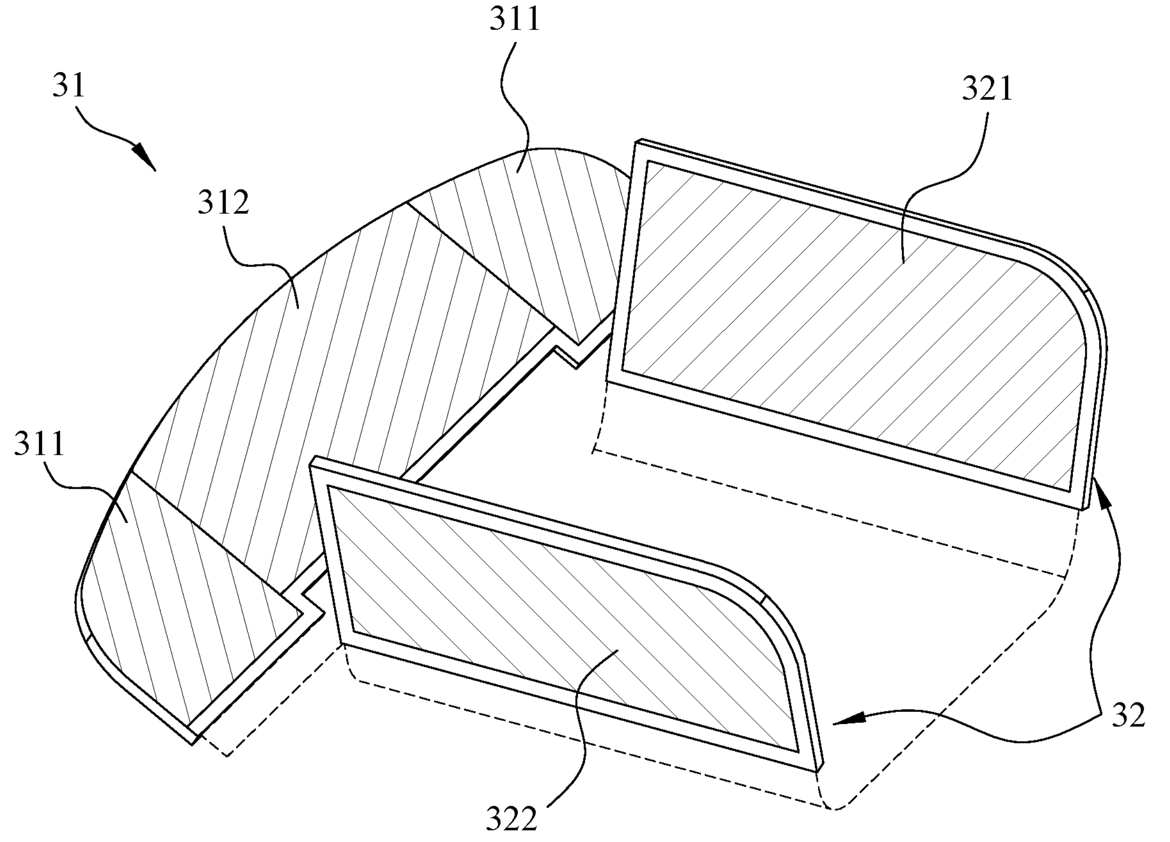
FIG. 8 illustrates a perspective view of a fixing structure of a sheet-like body, in accordance with specific embodiments of the invention disclosed herein.

In specific embodiments of the invention, the foldable nasal mask can comprise a body (e.g., filter sheet part) and a frame (e.g., fixing structure for the filter sheet), so that the two can be manufactured separately and assembled together for use. For example, FIG. 8 illustrates a perspective view of a fixing structure according to specific embodiments of the present invention. The fixing structure can be configured to have the same or similar distribution of attachment means as described before with reference to foldable nasal masks 1 and 2, and/or additional attachment means to further attach the filter sheet to the fixing structure. The fixing structure can include an upper assembly 31 for assembling the upper part of the body. The upper assembly 31 can include an upper inner attachment means 311 at the left and right sides of the inner side. Alternatively, upper assembly 31 can include an upper outer attachment means at the left and right sides of the outer portion of the upper assembly. The fixing structure can also include a lower assembly 32 for assembling the sheet. In the lower part of the body, the lower assembly 32 can include a lower part outer attachment means 322 at the left and right sides of the outer side. Alternatively, the lower assembly 32 can include a lower part inner side attachment part at the left and right sides of the inner side of the lower assembly. When the upper assembly 31 is assembled on the upper part of the sheet body, and the lower assembly 32 is assembled at the lower part of the sheet body, the upper inner attachment means 311 and the lower outer attachment means 322 can be attached to each other. Alternatively, the upper outer attachment means and the lower inner attachment means can be attached to each other. In any case, a sheet-like body (e.g., a filter sheet) installed therein can become or be a part of a tridimensional structure. This implementation provides an alternative for using the assembly mechanism of the present invention with an individual filter sheet which can be acquired separately, replaced, etc.

In specific embodiments of the present invention, the tridimensional structure formed by the corresponding attachment of the upper inner attachment means 311 and the lower outer attachment means 322 can be a set shape, so that the body (e.g., filter sheet) can be exchanged. In specific embodiments of the invention, the tridimensional structure formed by the outer side attachment means and the lower inner side attachment means correspondingly is a set shape, so that the body can be exchanged. The upper inner side attachment means and the lower outer side attachment means can be connected to each other with a connecting member (or attachment means). Alternatively, the upper outer attachment means and the lower inner attachment means can be connected to each other with a connecting member (or attachment means), so that the connecting members are in contact with the sheet. In specific embodiments of the invention, the body will not be separated when assembled and used, so as to increase the stability of the folding nasal mask of this creation.

In specific embodiments of the invention, the inner side of the upper assembly 31 of the fixing structure may further include additional attachment means to adhere portions of the structure to the user's nose/face, such as upper inner side attachment means 312 and/or lower inner side attachment means 321. Therefore, when assembled with the filter sheet, the foldable nasal mask can be more easily attached and adjusted to the front end of the user's nose, so as to avoid gaps and achieve a better blocking and filtering effect.

In specific embodiments of the present invention, the foldable nasal mask and its components can be transparent or of a color close to the skin, so that the foldable nasal mask of the present invention is less conspicuous and more beautiful. In embodiments in which the fixing structure is provided individually of the filter sheet, the two parts can be matching in regard to color and design. The material of the fixing structure can be any material of which the respective portions of the foldable nasal mask would have been made, or a more resistant material so that the fixing structure can be used multiple times with different filter sheets.

In specific embodiments of the invention, the dimensions of the foldable nasal mask or parts thereof can vary depending on the nose size (e.g., various sizes can be available such as small, medium large, kids, adults, etc.). In specific embodiments of the invention, when the filter sheet has a substantially rectangular shape, the dimensions of the nasal mask when unfolded can be 8 cm×6 cm. The slits can be of any length and extend from the side of the mask towards the center. In specific embodiments of the invention, the slits are 2.5 cm long. In specific embodiments of the invention where the slits separate the foldable nasal mask in an upper portion and a lower portion, the upper portion can be smaller than the lower portion. For example, a distance from the slits to the upper edge of the mask can be around 2 cm while a distance from the slits to a lower edge can be around 4 cm. The attachment means can be of various sizes and shapes. For example, a thin attachment means such as attachment means 213 can be of the order of 0.5 mm wide. In other embodiments, the attachment means extend through the complete length of the mask, for example upper inner side attachment means 211. The accommodating spaces described in this disclosure, for example with reference to accomodating space 215 can be small. In specific embodiments of the invention this accommodating space is 0.8 cm×1.5 cm.

As evidenced from the description above, the folded nasal mask of this invention is small, beautiful and inconspicuous. Furthermore, the mask does not necessarily need to be taken off during normal life activities such as eating, singing, speaking, sleeping, and going to the dentist, while still filtering the air inhaled in the nasal cavity at any time. At the same time, the nasal mask keeps the nasal cavity moist to improve the overall effect of protecting the respiratory tract, and it is not easy to interfere with facial recognition. Therefore, the proposed nasal mask prolongs the overall use time, and reduces the hassle of wearing a mask overall. In addition, the foldable nasal mask of the present invention can reduce the use and waste of materials due to the small required volume, and also reduce the transportation costs. The attachment means (e.g., adhesive components) can be detachably attached and fixed to each other, so that the folding nasal mask of the present invention can be tightly fixed on the front end of the user's nose with less interference. The mask does not move easily, and can be disassembled and reused depending on the situation. In addition, the foldable nasal mask of specific embodiments of the invention can also be used with a nasal septum holder to strengthen the fixation of the foldable nasal mask. Therefore, the foldable nasal mask of this invention is convenient to wear, easy to carry, and has good fixation, which can greatly increase the willingness to use it, and is especially suitable for people who are not used to wearing a mask. Furthermore, it can be used alone or in combination with other face shields or masks.

A method of using or wearing the foldable nasal mask of specific embodiments of the invention could include the following steps after unpacking a package of the foldable nasal mask: (1) if using a nose clamp (or nasal septum holder), push the attachment means of the clamp (e.g., pin) into the accommodating space (e.g., tube) of the foldable nasal mask; if not using a nose clamp, start from step 2 and skip step 4; (2) Take off any attachment means covers (e.g., adhesive covers); (3) Put the mask against the nostrils where the bottom meets the bottom edge of the nose; (4) Put the nose clamp into the nostrils (skip if no nose clamp is used); (5) Bend the mask to cover both nostrils and over the tip of the nose; (6) Attach the mask via its attachment means (e.g., adhesives) to the bridge and both sides of the nose; (7) Bend the bridge strip, if present, to adjust to fit the curve of the nose; (8A) Fold the left and right side of the bottom half of the mask upwards so that the attachment means (e.g., hook and loop fastener) on the inside of the bottom half is attached to the attachment means on the upper half of the mask or (8B) Fold the left and right side of the upper half of the mask downwards so that the attachment means (e.g., hook and loop fastener) on the inside of the upper half is attached to the attachment means on the lower half of the mask. At this point, the mask should cover both nostrils completely.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A nasal mask comprising:

a filter sheet comprising an inner side and an outer side;

a pair of slits on the filter sheet;

a first set of attachment means distributed on the inner side of the filter sheet; and a second set of attachment means distributed on the outer side of the filter sheet;

wherein the first set of attachment means includes two attachment means located on a first side of the pair of slits with one configured to adhere to a first ala of a nose and one configured to adhere to a second ala of the nose;

wherein the first set of attachment means includes at least one attachment means, located on a second side of the pair of slits opposite the first side, configured to adhere to the nose across a top of a nose tip of the nose; and wherein the filter sheet is adapted to be bent along the pair of slits so that at least one attachment means in the first set of attachment means is attached to at least one attachment means in the second set of attachment means.

2. The nasal mask of claim 1, wherein:

the first set of attachment means and the second set of attachment means are adhesives.

3. The nasal mask of claim 1, wherein:

the first set of attachment means includes at least: (i) an adhesive; and (ii) a hook and loop fastener; and the second set of attachment means includes at least a hook and look fastener that matches the hook and loop fastener of the first set of attachment means.

4. The nasal mask of claim 1, further comprising:

an accommodating space on the inner side of the filter sheet;

wherein the accommodating space is adapted to attach to an external attachment means.

5. The nasal mask of claim 4, wherein:

the accommodating space is one of a tube or a pocket; and the external attachment means is a pin of a nasal septum clip.

6. The nasal mask of claim 1, wherein:

the filter sheet comprises an upper part and a lower part; and the nasal mask comprises at least one of:

a bridge strip on the upper part, configured to adjust an upper edge of the nasal mask; and a lower strip on the lower part, configured to adjust a lower edge of the nasal mask.

7. The nasal mask of claim 1, further comprising:

at least one transverse pleat;

wherein the at least one transverse pleat is adapted to be opened to extend the filter sheet.

8. The nasal mask of claim 1, wherein:

each slit in the pair of slits has two opposite ends; and one of the two opposite ends is of a different shape than the slit.

9. The nasal mask of claim 1, wherein:

the pair of slits separates a top portion and a bottom portion of the filter sheet;

the at least one attachment means in the first set of attachment means is on the bottom portion; and the at least one attachment means in the second set of attachment means is on the top portion.

10. A nasal mask filter comprising:

an inner side;

an outer side;

a pair of slits;

at least two adhesives on the inner side; and a set of adhesion surfaces on the outer side;

wherein the at least two adhesives include two side adhesives located on a first side of the pair of slits with one configured to adhere to a first ala of a nose and one configured to adhere to a second ala of the nose;

wherein the at least two adhesives include at least one top adhesive, located on a second side of the pair of slits opposite the first side, configured to adhere to the nose across a top of a nose tip of the nose; and wherein the nasal mask filter is adapted to be bent along the pair of slits so that the outer side is adhered to the inner side.

11. The nasal mask filter of claim 10, further comprising:

an accommodating space on the inner side;

wherein the accommodating space is adapted to attach to an external attachment means.

12. The nasal mask filter of claim 11, wherein:

the accommodating space is one of a tube or a pocket; and the external attachment means is a pin of a nasal septum clip.

13. The nasal mask filter of claim 10, further comprising:

an upper part and a lower part;

wherein the upper part further comprises a bridge strip configured to adjust an upper edge of the nasal mask filter.

14. The nasal mask filter of claim 10, further comprising:

at least one transverse pleat;

wherein the at least one transverse pleat is adapted to be opened to extend the nasal mask filter.

15. The nasal mask filter of claim 10, wherein:

each slit in the pair of slits has two opposite ends; and one of the two opposite ends is of a different shape than the slit.

16. The nasal mask filter of claim 10, wherein:

the pair of slits separates a top portion and a bottom portion of the nasal mask filter; and the at least one top adhesive is on the top portion.

17. The nasal mask filter of claim 10, wherein:

the pair of slits separates a top portion and a bottom portion of the nasal mask filter; and the at least two side adhesives are on the bottom portion.

* * * * *